United States Patent [19]
Bi et al.

[11] Patent Number: 5,970,414
[45] Date of Patent: Oct. 19, 1999

[54] METHOD FOR ESTIMATING A MOBILE-TELEPHONE'S LOCATION

[75] Inventors: Qi Bi, Morris Plains; Wen-Yi Kuo, Parsippany; Sirin Tekinay, Mahwah, all of N.J.

[73] Assignee: Lucent Technologies, Inc., Murray Hill, N.J.

[21] Appl. No.: 08/866,901

[22] Filed: May 30, 1997

[51] Int. Cl.$^6$ .................................................. H04B 1/06
[52] U.S. Cl. ....................... 455/456; 455/422; 455/432; 455/524; 455/457
[58] Field of Search .................................. 455/456, 457, 455/61.6, 226.2, 524, 522, 422, 432, 525; 342/450, 387, 451, 457, 463, 357, 413

[56] References Cited

U.S. PATENT DOCUMENTS

| | | | |
|---|---|---|---|
| 5,512,908 | 4/1996 | Herrick ..................................... | 455/456 |
| 5,513,246 | 4/1996 | Lonsson et al. ..................... | 455/456 X |
| 5,613,205 | 3/1997 | Dufour ..................................... | 455/440 |
| 5,657,487 | 8/1997 | Doner ....................................... | 455/456 |
| 5,666,662 | 9/1997 | Shibuya .................................... | 455/456 |
| 5,815,538 | 9/1998 | Grell et al. ........................... | 455/456 X |
| 5,854,786 | 12/1998 | Henderson et al. .................... | 370/335 |

*Primary Examiner*—Wellington Chin
*Assistant Examiner*—Yemane Woldebatio

[57] ABSTRACT

The present invention is a method for accurately estimating a location of a mobile-telephone using forward link power control. In one embodiment, the present invention comprises the steps of transmitting first, second and third signals from first, second and third base stations during first, second and third time intervals; decreasing the power level of the first base station during at least portions of the second and third time intervals; receiving a mobile-telephone signal having receive information indicating times-of-arrivals of the first, second and third signals at the mobile-telephone; and estimating a location of the mobile-telephone using the receive information and known locations of the first, second and third base stations. Advantageously, this embodiment of the present invention actually decreases the interference level contribution of the first base station, and requires little change to the network side of existing wireless communication standards and no change to the mobile-telephone side.

29 Claims, 4 Drawing Sheets

METHOD FOR ESTIMATING A MOBILE-TELEPHONE'S LOCATION

BACKGROUND OF THE RELATED ART

The Federal Communication Commission (FCC) has requested all cellular and Personal Communication System (PCS) based operators to provide emergency 911 location services for mobile-telephones. Solutions to this challenging issue include typical prior art systems that use well-known location techniques, such as time difference of arrival (TDOA), ranging, angle-of-arrival, etc., to yield a good estimate of a mobile-telephone's location. These location techniques typically involve the use of times-of-arrivals observed at a single location or distributed locations together with "triangulation" principles to determine a mobile-telephone's location.

To determine a mobile-telephone's location to an acceptable accuracy using triangulation principles, one detector should be able to detect signals transmitted from at least three signal sources and record the times-of-arrivals of each signal at the detector. FIG. 1 illustrates a wireless communication system 1 adapted to use forward link signals, i.e., signals transmitted from base stations to a mobile-telephone, for locating a mobile-telephone 6 within the coverage area of the wireless communication system 1. The wireless communication system includes a plurality of base stations 4-1, . . . , 3. To locate a mobile-telephone 6 within the coverage area of the wireless communication system 1, the mobile-telephone 6 should be able to detect signals from at least three surrounding base stations and record times-of-arrivals for each of the detected signals. Using the recorded times-of-arrivals and the known locations of the corresponding base stations, the mobile-telephone's location can be estimated using triangulation principles.

The above described wireless communication system can also utilize reverse link signals, i.e., signals transmitted from the mobile-telephone to the base stations, to estimate the mobile-telephone's location. When using reverse link signals for location purposes, at least three base stations should be able to detect a signal transmitted from the mobile-telephone and record the times-of-arrivals at each of the base stations which are then used to estimate the mobile-telephone's location.

Regardless of the signal source, the accuracy of a triangulation based estimate of a mobile-telephone's location depends, in part, on the ability of one or more detectors to detect line-of-sight signals. Thus, if a detector does not detect the line-of-sight signals, it cannot record times-of-arrivals for the line-of-sight signals.

Generally, a signal may travel more than one path from the signal source to the detector. The signal can either travel a direct path or a reflected path to the detector. The signal traveling the direct path is the line-of-sight signal, whereas the signal traveling the reflected path is a multi-path or a non-line-of-sight signal. Detectors assume that the first signal it receives is the line-of-sight signal because such signal travels a more direct path (than non-line-of-sight signals) and, thus, should arrive at the detector before any non-line-of-sight signal. However, if the detector is unable to receive or hear the line-of-sight signal, it may assume a first arriving non-line-of-sight signal to be a line-of-sight signal. Since non-line-of-sight signals travel a greater distance than line-of-sight signals, the times-of-arrivals for non-line-of-sight signals will be later than those for line-of-sight signals. Accordingly, if times-of-arrivals for non-line-of-sight signals are used to estimate a mobile-telephone's location, then the accuracy of the estimate is adversely affected.

Whether a detector receives a line-of-sight signal depends mostly on the amount of attenuation or degradation the signal undergoes as it travels from the signal source to the detector and the power level at which the signal was transmitted. Generally, all signals attenuate or degrade as they travel from the signal source to the detector. The amount of attenuation or degradation depends on the environment through which it travels—for example, in urban environments where more obstacles, e.g., buildings, are likely to be between the signal source and the detector, the amount of attenuation or degradation to line-of-sight signals will generally be greater.

To compensate for possible attenuation or degradation of the line-of-sight signals, the wireless communication systems (utilizing reverse link signaling for location purposes) may require the mobile-telephone to transmit its signal at a higher power level. This would increase the signal-to-noise ratio at the base station, thereby offsetting the attenuation (and/or degradation) while increasing the likelihood of detecting the line-of-sight signals. However, increasing the power level of the reverse link signals significantly raises the interference level, i.e., noise, for other mobile-telephones in the same or neighboring cells.

One possible solution for increasing the signal-to-noise ratio of the line-of-sight signal without prolonged interference level increases involves the transmission of reverse link signals at higher power levels for short time periods. This solution, however, is difficult to implement without changing the mobile side of existing wireless communication standards. Specifically, the existing wireless communication standards provide guidelines for dynamically controlling the power level of reverse link signals based on strict factors such as distance from the mobile-telephone to the serving base station. The introduction of a new factor would require the development of a new dynamic reverse link power control scheme that takes into consideration this new factor, i.e., increasing reverse link signal power levels for short durations, thereby requiring a change to the mobile side of the wireless communication standards. Implementation of such changes (to the mobile side) would require corresponding upgrades to all mobile-telephones in the wireless communication network, thereby making the aforementioned solution difficult to implement. Accordingly, there exists a need for a method for accurately estimating a location of a mobile-telephone without significant increases to interference levels or changes to the mobile side of existing wireless communication standards.

SUMMARY OF THE INVENTION

The present invention is a method for accurately estimating a location of a mobile-telephone using forward link power control without significantly increasing interference levels or changing the mobile side of existing wireless communication standards. In one embodiment, the present invention comprises the steps of transmitting first, second and third signals from first, second and third base stations during first, second and third time intervals; decreasing the power level of the first base station during the second and third time intervals; receiving a mobile-telephone signal having receive information indicating times-of-arrivals of the first, second and third signals at the mobile-telephone; and determining a location of the mobile-telephone using the receive information and known locations of the first, second and third base stations.

Advantageously, this embodiment of the present invention actually decreases the interference level contribution of the first base station by decreasing its power level. This allows the signal-to-noise ratio of the second and third signals to be increased without increasing their respective interference level contributions. Furthermore, this embodiment requires no change to the mobile side of the wireless communication standards and little change to the network side of the wireless communication standard. In an alternate embodiment of the present invention, the power levels of the second and third base stations are increased during the second and third time intervals to increase the signal-to-noise ratio of the second and third signals.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
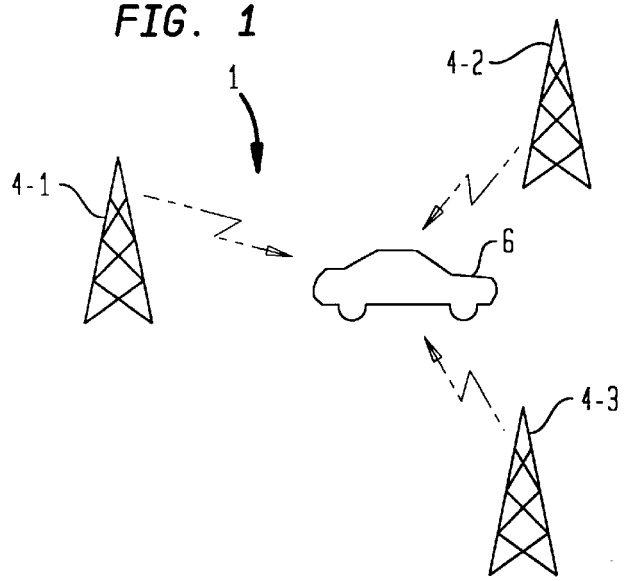
FIG. 1 depicts an illustration of a prior art wireless communication network adapted for location purposes.
Figure 2:
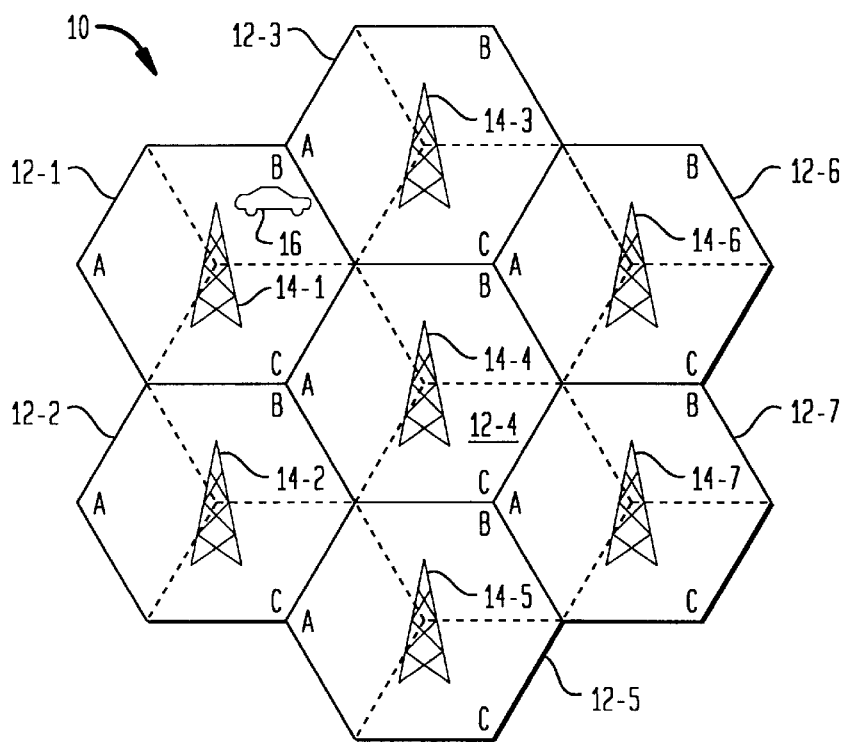
FIG. 2 depicts an illustration of a wireless communication network used in accordance with one embodiment of the present invention.

The present invention is a method for accurately estimating a location of a mobile-telephone using forward link power control. Referring to FIG. 2, there is shown a wireless communication network that provides wireless communication services to a geographical area 10 in accordance with one embodiment of the present invention. As shown in FIG. 2, the geographical area 10 is divided into cells 12-1, ..., 7, which are divided into sectors A, B, and C. Each cell 12-1, ..., 7 has associated a base station 14-1, ..., 7 which provides wireless communication coverage to the cell.

Each of the base stations 14-1, ..., 7 is connected to a mobile switching center (MSC), not shown, and includes a transmitter/receiver for transmitting and receiving signals, a location processor for estimating a mobile-telephone's location, and a time indicator which is synchronized with time indicators of other base stations using a common time reference, e.g., Global Positioning Satellite (GPS) system. For purposes of discussion, one embodiment of the present invention will be described herein with respect to wireless communication networks employing Code Division Multiple Access (CDMA) techniques based on the well-known IS-95A standards. It should be apparent to one of ordinary skill in the art that the present invention can be equally applicable to wireless communication networks employing other types of multiple access techniques, such as Time Division Multiple Access (TDMA), Frequency Division Multiple Access, etc.

Figure 3:
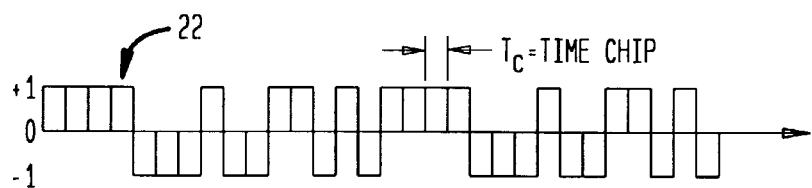
FIG. 3 depicts a partial pseudo-noise (PN) sequence.

Among the signals being transmitted by the base stations are pilot signals, synchronization signals, paging signals and access signals, as will be described herein. Pilot signals are forward link signals transmitted over a pilot channel. In one embodiment, the pilot signals are transmitted by each of the base stations 14-1, ..., 7 at an optimized power level such that the pilot signal can be "heard" or detected by any mobile-telephone within the associated cell without causing undue interference levels to mobile-telephones in neighboring cells. In IS-95A, the pilot signal is an unmodulated pseudo-noise (PN) sequence comprising a predetermined sequence of $2^{15}$ chips transmitted over a period T. FIG. 3 illustrates a partial PN sequence 20. The PN sequence 20 comprises a sequence of chips 22 representing a value 1 or −1. Each chip 22 has associated a time interval or period $T_c$ (also referred to herein as chip time).

Figure 4:
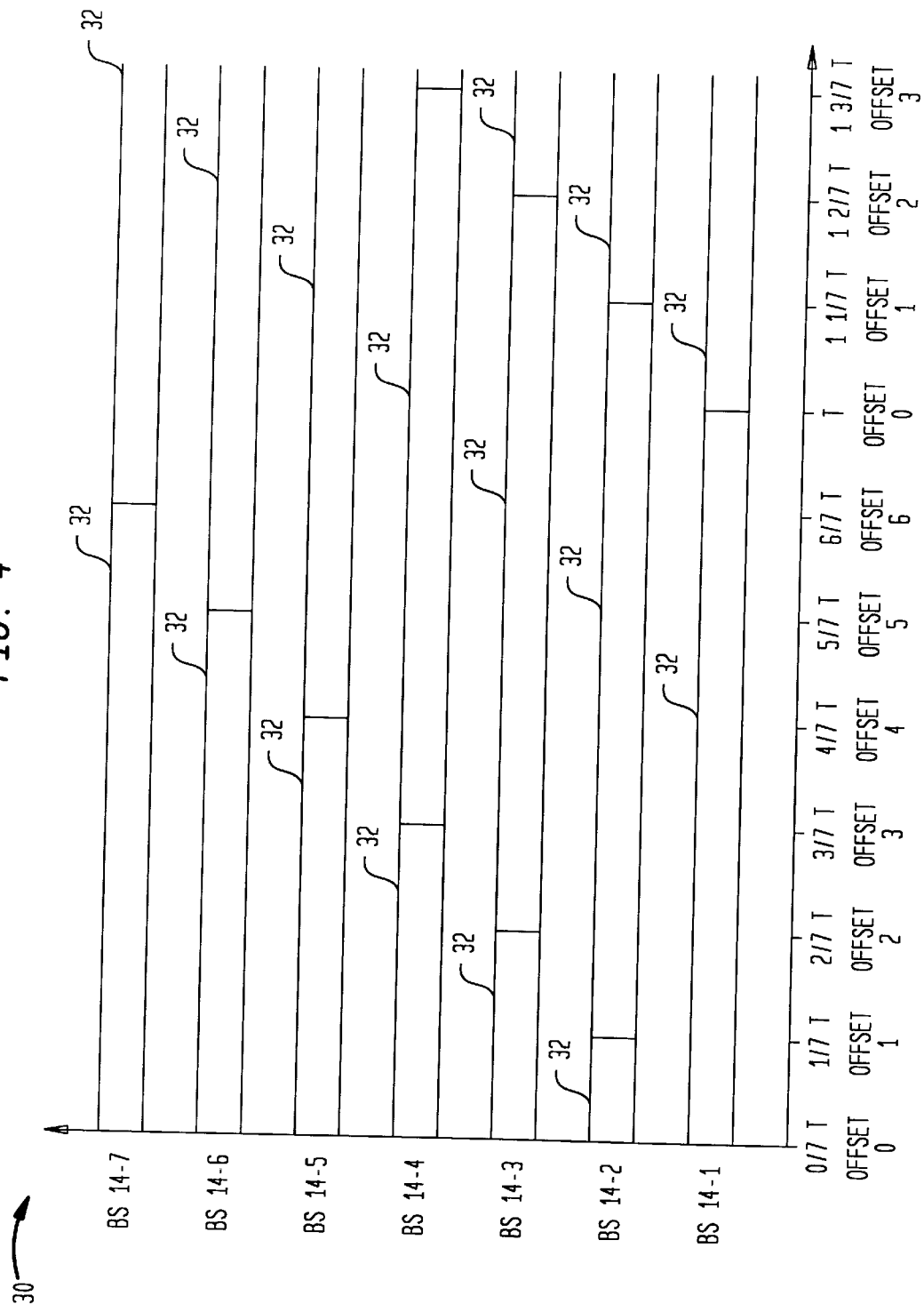
FIG. 4 depicts a chart illustrating pilot signal start times for the base stations depicted in FIG. 1.

In IS-95A, each of the base stations 14-1, ..., 7 repeatedly transmits an identical pilot signal but with start times different from other nearby base stations. Referring to FIG. 4, there is shown a chart 30 illustrating pilot signal start times for each of the base stations 14-1, ..., 7. Each of the base stations 14-1, ..., 7 continuously transmits a same pilot signal 32 at start times referred to herein as offsets 0, ..., 6, respectively. For example, base station 14-1 starts transmitting a new pilot signal 32 at each offset 0, base station 14-2 starts transmitting a new pilot signal 32 at each offset 1, etc. In IS-95A, the minimum offset between any two base stations at least sixty-four chip times $T_c$. In the example of FIG. 4, the offset between base stations is $$\frac{1}{7}T.$$

In one embodiment, the present invention uses the pilot signals to estimate a mobile-telephone's location. Specifically, this embodiment uses the mobile-telephone to detect the pilot signals and collect receive information corresponding to the detected pilot signal, i.e., times-of-arrivals and signal strength measurements of the detected pilot signals. Such receive information is subsequently used to estimate the mobile-telephone's location, as will be described herein. Note that the present invention should not be limited to using times-of-arrivals and/or signal strength measurements of pilot signals to estimate a mobile-telephone's location. Times-of-arrivals and/or signal strength measurements of other signals may also be used to estimate a mobile-telephone's location.

Figure 5:
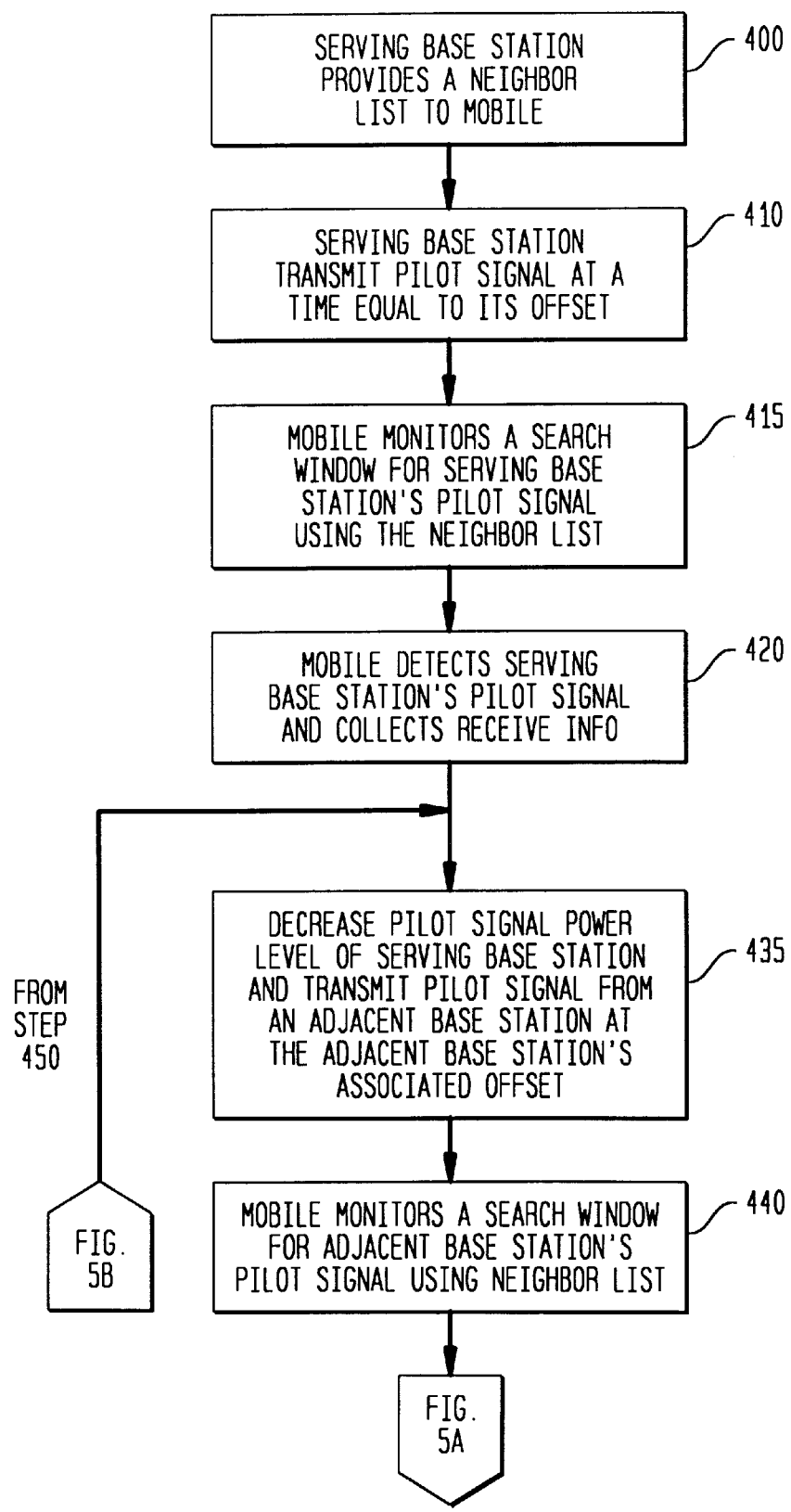
FIGS. 5 and 5a depict a flowchart illustrating the steps for accurately estimating a location of a mobile-telephone in accordance with one embodiment of the present invention.
Figure 5A:
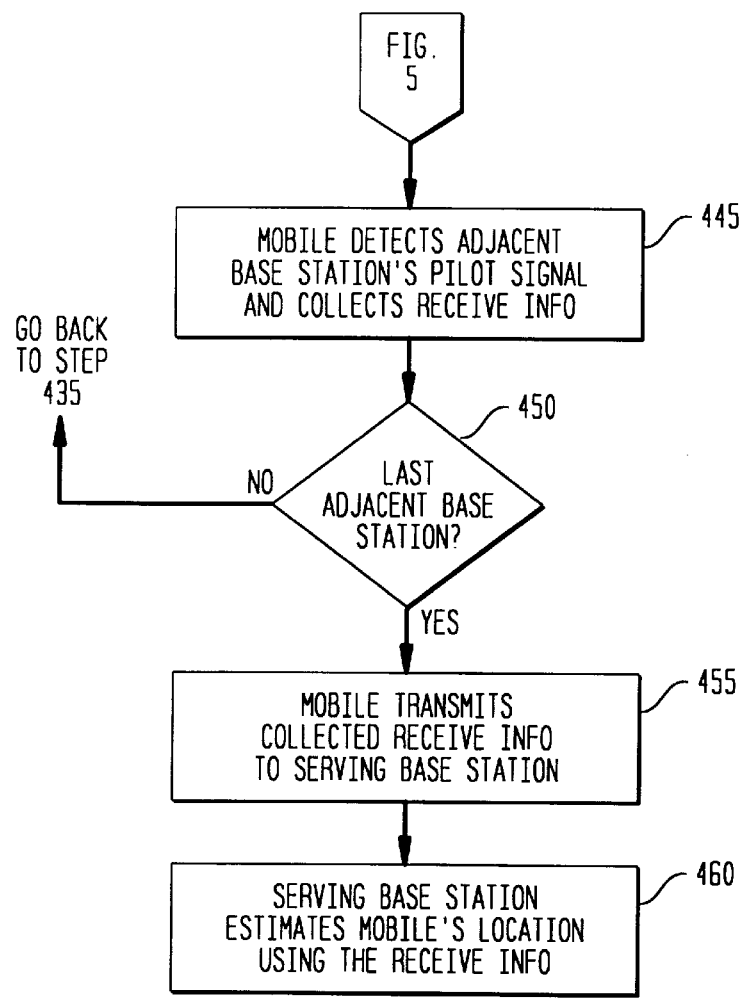

To increase the accuracy of the estimate, one embodiment of the present invention uses forward link power control. Advantageously, the use of forward link power control requires minimal changes to the network side of existing wireless communication standards and no changes to the mobile-telephone side, thus making it easier to implement. Referring to FIGS. 5 and 5a, a flowchart 40 illustrates the steps for accurately estimating a location of a mobile-telephone in accordance with one embodiment of the present invention. In step 400, a serving base station, i.e., base station with direct control of call processing for the mobile-telephone, provides the mobile-telephone with a neighbor list indicating the timing offsets associated with the pilot signal of the serving base station and base stations adjacent to the serving base stations. For example, as shown back in FIG. 2, if base station 14-1 is the serving base station for the mobile-telephone 16, then the neighbor list would at least indicate the offsets associated with the serving base station 14-1 and the adjacent base stations 14-3 and 14-4, i.e., offsets 0, 2 and 3. In IS-95A, the neighbor list is provided via a paging signal (i.e., forward link signal transmitted over a paging channel) from the serving base station.

In step 410, the serving base station starts transmitting a pilot signal at a time corresponding to its associated offset.

In step 415, the mobile-telephone monitors a search window for the serving base station's pilot signal using the offset indicated on the neighbor list. Specifically, the mobile-telephone uses the offsets in the neighbor list to approximate a search window during which the mobile-telephone should expect to detect the serving base station's pilot signal. For example, if the neighbor list indicates offset 0 (for the serving base station 14-1), then the mobile-telephone monitors for the serving base station's pilot signal during a search window defined by a predetermined time before offset 0 and a predetermined time after offset 0.

Figure 6:
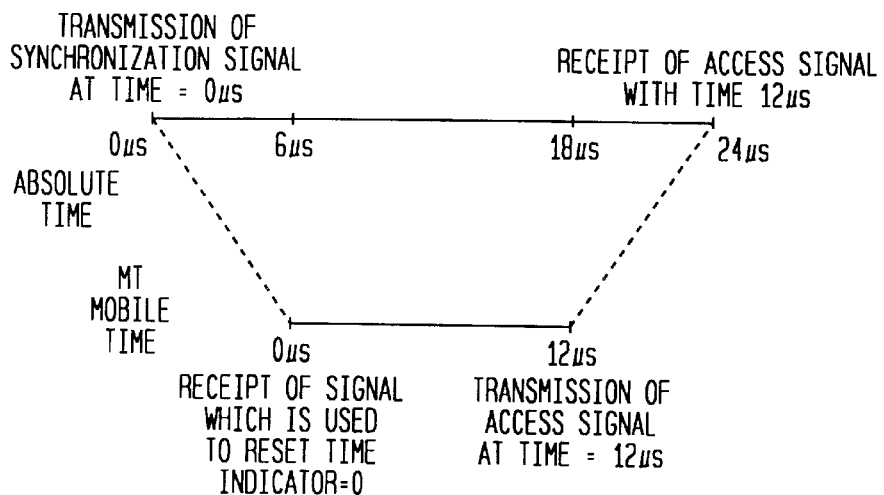
FIG. 6 depicts an example illustrating a manner in which a mobile-telephone is synchronized with a time provided by a base station.

Note that step 415 (and other subsequent steps) requires the mobile-telephone and/or the neighbor base stations to be time synchronized—that is, the time at the mobile-telephone and at the serving (and adjacent) base station should have some known relationship with each other. In one embodiment, the time at the mobile-telephone and serving (and adjacent) base station are synchronized using a common time reference, such as the well-known Global Positioning Satellite system or equivalent—that is, the mobile-telephone and the serving (and adjacent) base station will be set to the same time. In another embodiment, the mobile-telephone is synchronized with a time provided by the serving (or adjacent) base station. Referring to FIG. 6, there is shown an example illustrating a manner in which the mobile-telephone is synchronized with a time provided by the serving base station.

FIG. 6 shows an absolute time line 50 corresponding to the time at the serving (and adjacent) base station and a mobile time line 52 corresponding to the time at the mobile-telephone. At absolute time 0 $\mu$s the serving base station transmits a synchronization signal (i.e., forward link channel on a synchronization channel) indicating a time of 0 $\mu$s. At absolute time 6 $\mu$s, the mobile-telephone receives the synchronization signal and sets the mobile time to the time indicated in the synchronization signal, i.e., 0 $\mu$s. Twelve microseconds thereafter the mobile-telephone transmits an access signal (i.e., reverse links signal on a random access channel) indicating the current time at the mobile-telephone, i.e., 12 $\mu$s. The serving base station receives this access signal 6 $\mu$s later (at absolute time 24 $\mu$s) and uses the time indicated in the access signal, i.e., mobile time 12 $\mu$s, to calculate the path delay between the mobile-telephone and the serving base station—e.g., the mobile time 12 $\mu$s (indicated in the access signal) is subtracted from the absolute time 24 $\mu$s and divided by 2 to determine the path delay, i.e., 6 $\mu$s. Thus, the mobile time is 6 $\mu$s behind the absolute time. Note that the signal strength measurement (of a signal) can also be used, alone or in combination with the corresponding time-of-arrival, to determine path delay.

Referring back to FIGS. 5 and 5*a,* in step 420, the mobile-telephone detects the serving base station's pilot signal and records a time-of-arrival and a signal strength measurement for the detected serving base station pilot signal. Note that the manner in which a mobile-telephone detects a pilot signal is well-known in the art. In IS-95A, the mobile-telephone detects a pilot signal by searching the pilot channel for the predetermined sequence of $2^{15}$ bits that comprises all pilot signals.

Subsequently, for each adjacent base station indicated on the neighbor list, steps 435 to 445 are executed. In step 435, the pilot signal power level of the serving base station is decreased for the time interval corresponding to a pilot signal transmission by an adjacent base station. For example (and is referenced to FIG. 4), the serving base station 14-4 decreases its pilot signal power level during the pilot signal transmission by the adjacent base station 14-3—that is, the serving base station decreases its pilot signal power level during the time interval between times $$\frac{2}{7}T \text{ and } 1\frac{2}{7}T.$$

Note that upon completion of the pilot signal transmission by the adjacent base station, the pilot signal power level of the serving base station is increased to its original "optimized" power level.

Advantageously, the execution of step 435 decreases the interference level generated by the serving cell's pilot signal, thereby increasing the signal-to-noise ratio of the adjacent base station's pilot signal at the mobile-telephone. Such signal-to-noise ratio increase improves the mobile-telephone's ability to detect line-of-sight pilot signals from the adjacent base station.

In step 440, the mobile-telephone monitors a search window for the adjacent base station's pilot signal using the offset indicated on the neighbor list. In step 445, the mobile-telephone detects the adjacent base station's pilot signal and records a time-of-arrival and a signal strength measurement for the detected adjacent base station's pilot signal. Steps 435 to 445 are repeated at least once for each adjacent base station indicated on the neighbor list.

In another embodiment of the present invention, in step 435, the serving base station does not decrease its pilot signal power level, rather the adjacent base station increases its pilot signal power level during the transmission of its pilot signal. For example (and is referenced in FIG. 4), adjacent base station 14-3 increases its pilot signal power level during the time interval between times $$\frac{2}{7}T \text{ and } 1\frac{2}{7}T.$$

This embodiment increases the signal-to-noise ratio of the adjacent base station's pilot signal, thereby increasing the mobile-telephone's chances of detecting the line-of-sight pilot signal from the adjacent base station. In alternate embodiments, the adjacent base stations and/or the serving base station can decrease their pilot signal power level during the pilot signal transmission of other adjacent base stations and/or the serving base station, or increase their pilot signal power level during their own pilot signal transmission.

In step 455, the mobile-telephone transmits the receive information (collected for all the neighbor list base stations) to the serving base station. For example, the mobile transmits the times-of-arrivals, pilot signal strength measurements, or both. In step 460, the serving base station (or MSC) estimates the mobile-telephone's location. In one embodiment, the serving base station (or MSC) first determines path delays associated with the neighbor list base stations using the receive information, known transmission times of the pilot signals, and known geographical locations of the neighbor list base stations, and then estimates the mobile-telephone's location using well-known triangulation principles and the path delays Techniques for determining path delays are well-known in the art. Alternately, the mobile-telephone can estimate its own location using well known triangulation principles and transmit such estimate to the serving base station.

Note that the present invention should not be limited to the exact order of steps described herein. This embodiment of the present invention may be practiced using a different order of the aforementioned steps. Further note that a more accurate estimate of a mobile-telephone's location can be achieved with enhanced timing granularity at the mobile-telephone, thereby providing a more accurate time-of-arrival for the detected pilot signals. For example, the timing granularity at the mobile-telephone can be increased from microsecond levels to nanosecond levels.

Although the present invention has been described in considerable detail with reference to certain embodiments, other versions are possible. Therefore, the spirit and scope of the present invention should not be limited to the description of the embodiments contained herein.

We claim:

1. A method for locating a mobile-telephone in a wireless communication network using a plurality of base stations, the method comprising the steps of:
    transmitting a first signal from a first base station during a first time interval, a second signal from a second base station during a second time interval, and a third signal from a third base station during a third time interval;
    decreasing a power level of the first base station during at least portions of the second and third time intervals;
    receiving a mobile-telephone signal having receive information indicating times-of-arrivals of the first, second and third signals at the mobile-telephone; and
    estimating a location of the mobile-telephone using the receive information and known locations of the first, second and third base stations.

2. The method of claim 1 comprising the additional step of:
    transmitting a neighbor list to the mobile-telephone indicating offsets associated with the first, second and third base stations.

3. The method of claim 1 comprising the additional step of:
    synchronizing a time at the mobile-telephone with a time at the first base station using a common time reference.

4. The method of claim 3, wherein the step of synchronizing includes the step of:
    determining a path delay for a signal traveling between the first base station and the mobile-telephone.

5. The method of claim 4, wherein the path delay is used together with the receive information to estimate the location of the mobile-telephone.

6. The method of claim 3, wherein the first, second and third base stations are synchronized with the common time reference.

7. The method of claim 1, wherein the first, second and third signals are pilot signals.

8. The method of claim 7, wherein the pilot signals includes a predetermined sequence of bits.

9. The method of claim 1, wherein the first, second and third base stations are base stations surrounding the mobile-telephone.

10. The method of claim 1, wherein the first base station is a serving base station.

11. The method of claim 1 comprising the additional step of:
    decreasing a power level of the second base station during at least portions of the first and third time intervals.

12. The method of claim 11 comprising the additional step of:
    decreasing a power level of the third base station during at least portions of the first and second time intervals.

13. The method of claim 1, wherein the receive information includes signal strength measurements of the first, second and third signals at the mobile-telephone.

14. The method of claim 10, where the second base station and the second base station are non-serving base stations.

15. The method of claim 14, wherein said step of decreasing a power level of the first base station is performed to increase the likelihood that the mobile-telephone detects line-of-sight signals from the second and the third base stations.

16. The method of claim 1, wherein
    the first, second, and third signals are known signals;
    the mobile searches for the first, second, and third signals during first, second, and third search windows respectively; and
    said step of decreasing a power level of the first base station is performed in accordance with the timing of the first, second, and third search windows.

17. A method for locating a mobile-telephone in a wireless communication network comprising the steps of:
    transmitting a first signal from a first base station at a first power level during a first time interval, a second signal from a second base station at a second power level during a second time interval, and a third signal from a third base station at a third power level during a third time interval, the second power level being a power level higher than the first power level, the third power level being a power level higher than the first power level;
    receiving a mobile-telephone signal having receive information indicating times-of-arrivals of the first, second and third signals at the mobile-telephone; and
    determining a location for the mobile-telephone using the receive information and known locations of the first, second and third base stations.

18. The method of claim 17 comprising the additional step of:
    transmitting a neighbor list to the mobile-telephone indicating offsets associated with the first, second and third base stations.

19. The method of claim 17 comprising the additional step of:
    synchronizing a time at the mobile-telephone with a time at the first base station using a common time reference.

20. The method of claim 19, wherein the step of synchronizing includes the step of:
    determining a path delay for a signal traveling between the first base station and the mobile-telephone.

21. The method of claim 20, wherein the path delay is used together with the receive information to determine the location of the mobile-telephone.

22. The method of claim 19, wherein the first, second and third base stations are synchronized with the common time reference.

23. The method of claim 17, wherein the first, second and third time signals are pilot signals.

24. The method of claim 17, wherein the first, second and third base stations are base stations surrounding the mobile-telephone.

25. The method of claim 24, wherein the first base station is a serving base station.

26. The method of claim 17, wherein the receive information includes signal strength measurements of the first, second and third signals at the mobile-telephone.

27. The method of claim 25, wherein the second base station and the third base station are non-serving base stations.

28. The method of claim 27, wherein the second base station transmits at the second power level during the second time interval, and the third base station transmits at the third power level during the third time interval, to increase the likelihood that the mobile-telephone detects line-of-sight signals from the second base station and the third base station.

29. The method of claim 17, wherein
the first, second, and third signals are known signals;
the mobile searches for the first, second, and third signals during first, second, and third search windows respectively; and
the second and third power levels are set higher than the first power level in accordance with the timing of the first, second, and third search windows.

* * * * *